United States Patent
Aviv et al.

(10) Patent No.: US 9,216,930 B2
(45) Date of Patent: Dec. 22, 2015

(54) CONTINUOUS PROCESS FOR MANUFACTURING A NEUTRAL GRANULAR P/K FERTILIZER

(71) Applicant: ROTEM AMFERT NEGEV LTD., M.P. Arava (IL)

(72) Inventors: Talia Aviv, D.N. Hanegev (IL); Uri Sasson Cohen, Metar (IL); Doron Orgil, Arad (IL); Itsik Aroch, Beer Sheva (IL)

(73) Assignee: Rotem Amfert Negev Ltd., M. P. Arava (IL)

( * ) Notice: Subject to any disclaimer, the term of this patent is extended or adjusted under 35 U.S.C. 154(b) by 0 days.

(21) Appl. No.: 14/408,365

(22) PCT Filed: Jun. 27, 2013

(86) PCT No.: PCT/IL2013/050551
§ 371 (c)(1),
(2) Date: Dec. 16, 2014

(87) PCT Pub. No.: WO2014/002097
PCT Pub. Date: Jan. 3, 2014

(65) Prior Publication Data
US 2015/0152015 A1    Jun. 4, 2015

(30) Foreign Application Priority Data

Jun. 28, 2012 (IL) .......................................... 220685

(51) Int. Cl.
*C05B 7/00* (2006.01)
*C05B 17/00* (2006.01)
*C05B 13/06* (2006.01)
*C01B 25/30* (2006.01)

(52) U.S. Cl.
CPC ............... *C05B 17/00* (2013.01); *C01B 25/301* (2013.01); *C05B 7/00* (2013.01); *C05B 13/06* (2013.01)

(58) Field of Classification Search
CPC ........................................................ C05B 7/00
USPC ............................................................. 71/34
See application file for complete search history.

(56) References Cited

U.S. PATENT DOCUMENTS 8,193,119 B2    6/2012    Fabry
8,216,972 B1    7/2012    Fabry

FOREIGN PATENT DOCUMENTS

| CA | 2639378 A1 | | 3/2009 |
|----|------------|---|--------|
| WO | 2009/072106 | * | 6/2009 |

* cited by examiner

*Primary Examiner* — Wayne Langel
(74) *Attorney, Agent, or Firm* — Roach Brown McCarthy & Gruber, P.C.; Kevin D. McCarthy

(57) ABSTRACT

The invention provides a continuous process for manufacturing an essentially neutral phosphorus/potassium rich fertilizer from basic chemical commodities. The fertilizer is a freely-flowing particulate solid.

8 Claims, No Drawings

CONTINUOUS PROCESS FOR MANUFACTURING A NEUTRAL GRANULAR P/K FERTILIZER

FIELD OF THE INVENTION

The present invention relates to a method of manufacturing a particulate phosphorus/potassium rich fertilizer from basic chemical commodities which is easy to store and handle.

BACKGROUND OF THE INVENTION

Potassium phosphates, offering to the plants important elements P/K in a soluble form, belong among the most popular fertilizers, but some of them are difficult to store and manipulate. For example, rather basic dipotassium phosphate (DKP) would make a quite desirable combination with rather acidic monopotassium phosphate (MPK), but the inherent instability of the former in regard to water content, due to its hygroscopicity, makes any manipulations difficult. Ideally, fertilizers should be easily manufactured and should have suitable consistency for easy handling. The art still does not provide enough fertilizers with the required characteristics, suitable for all situations. WO2009/072106 provides a process for manufacturing a solid, freely flowing particulate fertilizer of the formula $K_3H_3(PO_4)_2$ from MPK and potassium hydroxide (KOH). It is an object of the present invention to provide a method for manufacturing an easy-to-handle granular P/K fertilizer from commodity chemicals.

It is further an object of the invention to provide a solid fertilizer supplying phosphorus and potassium, essentially consisting of $K_2O$ and $P_2O_5$ in the weight ratio 1:1, which is freely-flowing and without tendency to cake.

It is another object of this invention to provide a method for manufacturing a particulate, easy-to-handle P/K fertilizer from phosphoric acid and potassium hydroxide.

Other objects and advantages of present invention will appear as description proceeds.

SUMMARY OF THE INVENTION

The invention provides a continuous process for manufacturing a solid phosphorus/potassium (P/K) fertilizer from phosphoric acid (PA) and potassium hydroxide (KOH), the fertilizer providing essentially neutral pH and being particulate and freely-flowing, said process comprising i) the step of providing a concentrated aqueous solution of PA and a concentrated aqueous solution of KOH; ii) the step of combining said concentrated solutions of step i) in a reactor ensuring a reaction temperature between 85 and 120° C., whereby obtaining a liquid reaction mixture; iii) the step of drying said reaction mixture of step ii) in a vacuum dryer ensuring a reaction temperature between 85 and 120° C. and a pressure of at most 400 mbar, whereby obtaining a solid material; wherein said step of drying is separated in time and space from said step ii), and iv) cooling down said solid material of step iii) to ambient temperature; thereby obtaining the solid fertilizer without tendency to cake, essentially consisting of $K_3H_3(PO_4)_2$ and water in an amount of 10 wt % or less. Step of drying comprises combining a liquid stream with a partially dried solid, both the stream and the solid consisting of the product of the reaction between PA and KOH. Said combining may comprise injecting said stream, or dripping it or spraying onto said partially dried solid. The continuous process according to the invention preferably further comprises the step of preparing concentrated solutions of $K_3H_3(PO_4)_2$. In a preferred embodiment of the invention, said steps ii) and iii), which are separated in time and space, are performed at a temperature of from 90 and 115° C. Said step ii), is preferably performed at a pressure of at most 300 mbar. Said PA and said KOH are included in the reaction preferably in a weight ratio of from 1.14 and 1.22. The amount of water in the fertilizer product is preferably 10 wt % or less, and more preferably 5 wt % or less. In a preferred embodiment, said PA and said KOH are included in a weight ratio of from 1.16 and 1.20. In a process of the invention, said reactor and said vacuum dryer are parts of an apparatus, which may constitute two separate units or may be integrated, wherein the product of the reaction between PA and KOH is continuously fed to the apparatus and moves through it, thereby continually converting reactants into freely flowing solid neutral potassium phosphate, the reactants being solid or liquid PA and KOH, and a liquid of aqueous $K_3H_3PO_4$ resulting from said PA and KOH. The reactants are continuously fed to the reactor and the liquid product is continuously fed to the dryer by a pump or screw conveyor. Said apparatus comprises reactor unit, dryer unit, cooling unit, transporting means for moving said products between the units, and controlling means for checking the product composition and humidity and in accordance with the results regulating the velocity of the movement of the material through the apparatus.

The invention is directed to a solid freely-flowing P/K fertilizer prepared from PA and KOH, comprising $P_2O_5$ and $K_2O$ in almost equal weight ratio, without tendency to caking. The solid fertilizer according to the invention consists of at least 80 wt % $K_3H_3(PO_4)_2$ and at most 10 wt % water. The solid fertilizer preferably consists of at least 90 wt % of potassium phosphate of the formula $K_3H_3(PO_4)_2$ and of water in an amount of at most 10 wt %, preferably in an amount of 0.1 wt % to 5 wt %. In one embodiment, the solid fertilizer consists of at least 90 wt % $K_3H_3(PO_4)_2$ and at most 1 wt % water. The fertilizer of the invention usually exhibits XRD signals characterized by diffraction data numbers 00-019-0965 and 00-019-0964. The fertilizer prepared according to the invention may, in one embodiment, consist of potassium phosphate of the formula $K_3H_3(PO_4)_2$ in an amount of from about 92 wt % to about 99 wt %, water in an amount of up to 8 wt %, and incidental impurities of up to 5 wt %.

DETAILED DESCRIPTION OF THE INVENTION

A continuous process for manufacturing a non-caking particulate P/K fertilizer from commodity chemicals has now been provided, comprising simple steps of i) providing concentrated aqueous solutions of phosphoric acid (PA) and potassium hydroxide (KOH), ii) reacting said two aqueous solutions at a PA/KOH weight ratio of about 1.18, whereby obtaining a liquid or slurry product, iii) drying the liquid or slurry product by contacting it, under vacuum conditions, with solid phase consisting of neutral potassium phosphate, whereby obtaining a granular powder, and iv) cooling the powder whereby obtaining the final freely-flowing fertilizer, wherein said steps occur gradually at adjacent locations separated in time and space, enabling a continuous transformation of liquid PA and KOH to the granular P/K fertilizer.

The invention relates to a continuous process of manufacturing a solid, free flowing, preferably white, fertilizer consisting of potassium phosphate of the formula $K_3H_3(PO_4)_2$. The continuous process comprises steps of reacting potassium hydroxide (KOH) and phosphoric acid (PA), drying the reaction mixture under vacuum while contacting solid phase, and cooling the dried mixture. The raw materials use preferably in the form of solutions, including KOH solution and phosphoric acid solution. The reactants, PA and KOH, are admixed preferably in a weight ratio of from 1.14 to 1.22, more preferably in a weight ratio of from 1.16 to 1.20. The reactants, thus, include common commodity chemicals, which may be provided at any purity levels, as far as agriculturally unacceptable materials are excluded. The concentrated aqueous raw materials are preferably solutions. In a preferred arrangement of the process, said two aqueous raw materials form two reactant streams flowing into a reactor provided with temperature and pressure control. The reactor is capable to keep the reaction mixture preferably at a temperatures of between 85° C. to 120° C., more preferably at a temperature of 90° C. to 115° C. The liquid product of the reaction continues to a vacuum dryer capable to keep the materials preferably at a temperature of 85° C. to 120° C. and at a pressure of 400 mbar or less, more preferably at a temperature of 90° C. to 115° C. and a pressure of 300 mbar or less. The liquid from the reactor drips slowly onto the partially dried material in the vacuum dryer. The feeding velocity is controlled in accordance with the capability of the vacuum drier to continually remove the vapor. Said reactants, when entering the process, comprise water in amounts not interfering with the required reaction velocity. Powder or granules comprising a partially dried mixture of PA and KOH in a weight ratio between 1.14 and 1.22 is initially located in the vacuum drier. In a preferred embodiment, a layer of dry $K_3H_3PO_4$ covers the walls of the dryer, for example of the screw conveyer. The material is usually scraped off the dryer walls, leaving a part of the solid for contacting the fresh solution. Solid, partially dried material, thus, slowly moves along the vacuum dryer unit and is discharged to the cooler. The cooling unit cools the particular material down to ambient temperature, whereby obtaining the final fertilizer.

The process of the invention preferably comprises reacting concentrated solutions of PA and KOH, the former having for example a concentration between 50 and 85 wt %, such as more than 80 wt %, and the latter for example between 30 and 52 wt %, such as at least 50 wt %. The continual process optionally comprises a step of providing concentrated solutions of PA and KOH by dissolving solids or diluting more concentrated solutions or suspensions. In one embodiment, raw reactants are continually fed to the integrated apparatus comprising reactor unit, dryer unit, and cooling unit. The feeding velocities enable mixing the KOH and PA in a molar ratio of from 1.45 to 1.55. The invention provides an apparatus for continuously manufacturing a particular P/K fertilizer from raw PA and KOH, the apparatus comprising a reactor unit with temperature control means, vacuum dryer unit with temperature and pressure control means, cooling unit, and transport means enabling continuous movement of the material from the reactant stage to the final fertilizer stage through the apparatus from the reactant stock containers to the final product stock container; said temperature control means keeping the temperature between 85 and 120° C., said temperature and pressure control means keeping the temperature between 85° C. to 120° C. and the pressure preferably below 300 mbar; said transport means moving the materials through the apparatus at a velocity providing a humidity of the final fertilizer of 8 wt % or less, such as between 0.1 and 7 wt %, preferably 5 wt % or less, such as between 0.2 and 2 wt %. In one aspect, the apparatus of the invention can provide non-caking granular P/K fertilizer either from PA and KOH, or from MKP and KOH.

The invention provides a continuous process for converting commodity chemicals, PA and KOH, to a granular free-flowing P/K fertilizer concentrate providing essentially neutral pH. The pH of an aqueous solution provided by the fertilizer of the invention is preferably between 6.3 and 7.3. The flow ability of a fertilizer product is determined by measuring the time taken by 300 g fertilizer to flow through a truncated cone made of stainless steel, the apex being cut to provide a hole of 1 cm in diameter. The time, t taken by 300 g product, after opening the hole, is compared with the time taken by 300 g of well flowing standard MPK (or other free flowing fertilizer), $t_S$, and the relative fluidity in %, f, is calculated according to the formula:

$$f=100*t_S/t$$

The relative fluidity of the fertilizer according to the invention is preferably at least 50%, such as at least 60% or at least 70%, for example at least 80% or at least 85%.

The invention relates to a continuous method for providing solid, P/K-rich, soluble, neutral, freely-flowing granular, non-caking fertilizer, easy to handle and ready for mixing with additional nutrients. The fertilizer of the invention consists essentially of potassium phosphate of formula $K_3H_3(PO_4)_2$; it means that the fertilizer contains mainly neutral phosphate, for example between 80 wt % and 98 wt % potassium phosphate of said formula, preferably between 90 wt % and 99 wt %, the remainder being predominantly water. Other agriculturally acceptable components may be present. The above formula corresponds to the equimolar mixture of MKP and DKP. As explained, DKP, although a desired fertilizer, is difficult to work with. The fertilizer of the invention provides the same composition as a mixture of MKP with DKP, but without need to purchase or obtain, and store and work with said DKP or even said MKP. The freely flowing fertilizer of the invention, not tending to caking, had better consistency than a simple mix of MKP and DKP when compared. The fertilizer according to the invention is obtained from common commodity chemicals in a simple process, and is highly suitable for agricultural applications as a superior potassium and phosphorus source for fertilization. The fertilizer can be easily stored, as well as shipped and applied to the areas of desired use.

The invention, thus, provides the desired concentrated fertilizing source of P/K in a continuous process, providing a solid freely-flowing and non-caking fertilizer essentially comprised of $K_3H_3(PO_4)_2$, wherein the process comprises contacting liquid neutral phosphate with its solid form at a temperature preferably above 90° C., for example 95° C., possibly by dripping the liquid onto the partially dried solid surface, wherein the solution is made from KOH and phosphoric acid. When relating to a neutral fertilizer, intended is a liquid or solid which provides a pH of between 6 and 8 when diluted with water, preferably pH of between 6.5 and 7.1 when diluted to an aqueous solution containing 1-5 wt % solids.

The invention will be further described and illustrated in the following examples.

EXAMPLES

Methods

White phosphoric acid made by Rotemamfert, Israel, was used. KOH was obtained from Albemarle, Europe.

The content of water was determined by thermogravimetric analysis, the content of $P_2O_5$ spectrophotometrically, the content of $K_2O$ by potentiometric titration with tetraphenylborate.

The hygroscopicity was characterized as the critical relative humidity (C.R.U.), by determining a relative humidity of an environment in which water absorption by the sample causes a mass increase higher than 3%; hygroscopicity of the product was usually 50% C.R.H. (critical relative humidity).

Example 1

The apparatus for continuous manufacturing the fertilizer has three sections: reactor, vacuum dryer, and cooler. Reactants were fed to the reactor part, 83 wt % PA solution at a velocity of 4.55 gr/min and 50 wt % KOH solution at a velocity of 6.48 gr/min. The reaction mixture was kept at a temperature of between 90° C. and 115° C. by the exothermic reaction and further by a heating jacket filled with 120° C. oil. The liquid mixture was fed into the vacuum dryer by a peristaltic pump at flow rate of 6-7 gr/min. The vacuum dryer, three liter volume, was filled up with 1515 gr of powder or granular $K_3H_3(PO_4)_2$, prepared by a batch procedure, before the start of feeding with the liquid mixture. The dryer was agitated and set to operate at 300-400 mbar vacuum and temperature of 90° C. to 115° C. at the feeding area. The product flowed to the cooler, working under the same vacuum conditions but being held at a temperature of 45° C. by a jacket with controlled temperature. The powder product was packed. The product contained about 0.2 wt % water (lost at 80° C.), 45.7 wt % $P_2O_5$ and 45.5 wt % $K_2O$. The relative flow ability was above 85% (100% MKP). The product was granular with 60% size fraction larger than 300 micron.

Example 2

A batch process was performed; 411 kg of $KH_2PO_4$ was dissolved in 1420 kg of water, and 170 kg of 50 wt % KOH was added; the reaction occurred, and the solution was heated up to 90° C. to 115° C. and fed into vacuum dryer filled with 1984 kg powder or granular $K_3H_3(PO_4)_2$. The dryer worked under 70 mbar vacuum condition, 12 rpm agitation and temperature between 90° C. to 115° C. At the end of feeding, the vacuum dryer was cooled down to 45° C. The product was similar to the product described in Example 1.

While this invention has been described in terms of some specific examples, many modifications and variations are possible. It is therefore understood that within the scope of the appended claims, the invention may be realized otherwise than as specifically described.

The invention claimed is:

1. A continuous process for manufacturing a solid phosphorus/potassium (P/K) fertilizer consisting essentially of $K_3H_3(PO_4)_2$ and water in an amount of up to 10 wt % from phosphoric acid (PA) and potassium hydroxide (KOH), the fertilizer being particulate and freely-flowing, its relative fluidity being at least 60%, said process comprising
    i) the step of providing a concentrated aqueous solution of PA, between 50 and 85 wt %, and a concentrated aqueous solution of KOH, between 30 and 52 wt %;
    ii) the step of combining said concentrated solutions of step i) in a reactor ensuring a PA/KOH dry weight ratio between 1.14 and 1.22 and a reaction temperature between 85 and 120° C., thereby obtaining a liquid reaction mixture;
    iii) the step of drying said reaction mixture of step ii) in a vacuum dryer ensuring a reaction temperature between 85 and 120° C. and a pressure of at most 400 mbar, whereby obtaining a solid material, wherein said step of drying is separate in time and space from said step ii) and comprises dripping said reaction mixture of step ii) onto a partially dried solid surface; and
    iv) cooling down said solid material of step iii) to ambient temperature;
    thereby obtaining the solid fertilizer providing essentially neutral pH and without tendency to cake, corresponding in the composition to an equimolar mixture of MKP and DKP while obviating the need to handle DKP.

2. A continuous process according to claim 1, further comprising the steps of preparing the concentrated solutions of PA and KOH.

3. A process according to claim 1, wherein said steps ii) and iii) are separated in time and space and are performed at a temperature of from 90 and 115° C.

4. A process according to claim 1, wherein said step iii), separate in time and space from said step ii), is performed at a pressure of at most 300 mbar.

5. A process according to claim 1, wherein said amount of water is 5 wt % or less.

6. A process according to claim 1, wherein said PA and said KOH are included in a weight ratio of from 1.16 and 1.20.

7. A process according to claim 1, wherein said reactor and said vacuum dryer are integrated in an apparatus through which the products of the reaction between PA and KOH continuously move, thereby continually converting reactants PA and KOH into freely flowing solid neutral potassium phosphate.

8. A process according to claim 7, wherein said apparatus comprises reactor unit, dryer unit, cooling unit, transporting means for moving said products between the units, and controlling means for checking the product humidity and regulating the velocity of product movement.

* * * * *